United States Patent Office 3,202,703
Patented Aug. 24, 1965

3,202,703
1,4-BIS(o-CHLOROBENZYLAMINO)-CYCLO-
HEXANE AND SALT THEREOF
Leslie G. Humber, Montreal, Quebec, Canada, assignor to
American Home Products Corporation, New York,
N.Y., a corporation of Delaware
No Drawing. Filed June 4, 1963, Ser. No. 285,204
3 Claims. (Cl. 260—501)

This invention relates to novel chemical compounds, certain new derivatives of 1,4-diaminocyclohexane, and to the process utilized in their preparation.

More particularly, my invention relates to aralkyl and substituted aralkyl derivatives of 1,4-diaminocyclohexane, which new chemical compounds possess valuable pharmacological properties.

The new chemical compounds, in base form, may be generically represented by the formula:

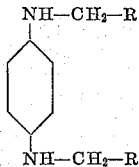

wherein R represents aryl or substituted aryl.

It is understood that the compounds of this invention are capable of existing in two geometrically isomeric forms, commonly called cis and trans depending on the orientation of the two side chains which are attached to the central cyclohexane nucleus. It is understood that the geometrical isomers of any of the novel compounds referred to are intended to be within the scope of my invention.

The novel chemical compounds possessing interesting biological activities, in base form, are thus 1,4-bis (aralkyl) or (substituted aralkyl-amino)-cyclohexanes. These compounds, being basic in nature, form tertiary acid addition salts. Such salts with pharmacologically acceptable acids are biologically equivalent to the free base and constitute a preferred form for the administration of the compounds of my invention.

The new chemical compounds forming the subject of this invention are useful as agents for lowering serum cholesterol levels.

My preferred procedure for preparing the new chemical compounds may be described as follows:

1,4-diaminocyclohexane, a compound previously described by Curtius and Stangassinger, J. Prakt. Chem., 91, 1 (1915), or 1,4-cyclohexanedione, are reacted respectively with two moles of an araldehyde or substituted araldehyde or with two moles of a benzylamine or substituted benzylamine, and removing two molecules of water from the reaction mixture. The resulting isomeric Schiff's bases may then be reduced to the same secondary amino derivative by treatment with a reducing agent, such as, for example, by treatment with sodium borohydride, hydrogen and a noble metal catalyst, or lithium aluminum hydride.

The free base is then recovered, preferably by evaporation of the solvent. The resulting product may then be converted to a suitable acid addition salt, thereof, by conventional means, as by treatment with a pharmacologically acceptable acid. For example, the acetate salt may be readily obtained by treatment of the base with acetic acid in ether solution.

This process may be indicated schematically as follows:

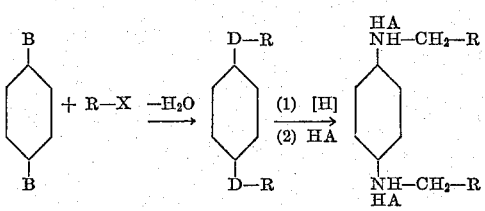

where, when B is $NH_2$ and X is CHO, D is —N=CH—, and B is =O (ketonic oxygen) and X is $CH_2$—$NH_2$, D is =N—$CH_2$—; where HA represents a pharmacologically acceptable acid, and R represents a phenyl ring, which may or may not be substituted. Where substituted, the substituents on the phenyl rings may be substituents such as halogen, lower alkyl, hydroxyl, lower alkoxy, benzyloxy, amino, lower acylamino, di-lower alkylamino nitro, lower alkylthio, trihalomethyl and sulfonamido groups.

My invention may be illustrated by the following example, which should be regarded as illustrative of this invention, rather than as limiting the same.

EXAMPLE 1,4-bis (o-chlorobenzylamino)-cyclohexane (a) Trans-1,4-diaminocyclohexane (1.85 gm.) and o-chlorobenzaldehyde (4.65 gm.) were dissolved in benzene and refluxed until the theoretical quantity of water had collected in a Dean-Starke trap. The benzene was removed by evaporation in vacuo, i.e., at a pressure less than atmospheric, to yield the intermediate Schiff's base as an oil. It was then dissolved in a methanol:benzene (4:1) mixture and treated portionwise with 1.25 gm. of sodium borohydride. After refluxing for five hours the solvents were removed in vacuo, and the residue was distributed between water and ether. The ethereal layer, after drying and evaporation, yielded 1,4-bis(o-chlorobenzylamino)-cyclohexane as white prisms; M.P. 65–72° C.

A diacetate salt of this compound was prepared in ether by treatment of the base with an ethereal solution of acetic acid. The salt was crystallized from an acetone-hexane mixture and had a melting point of 148–155° C.

Analysis confirmed the empirical formula $$C_{24}H_{32}N_2O_4Cl_2$$

(b) 1,4-cyclohexanedione (2.8 gm.) and o-chlorobenzylamine (7.1 gm.) were converted to the Schiff's base by refluxing in benzene. The benzene was removed in vacuo, replaced by methanol (100 ml.), treated portionwise with sodium borohydride (2.5 gm.) and refluxed overnight.

The solvent was removed in vacuo and the residue distributed between water and benzene. The benzene layer, after drying and evaporation, yielded 1,4-bis(o-chlorobenzylamino)-cyclohexane.

The diacetate salt, prepared as described above, had M.P. 149–156° and did not depress the melting point of the previously described sample.

I claim:
1. A compound selected from the group which consists of 1,4-bis(o-chlorobenzylamino)-cyclohexane and its diacetate salt.
2. 1,4-bis(o-chlorobenzylamino)-cyclohexane.
3. The diacetate salt of 1,4-bis(o-chlorobenzylamino)-cyclohexane.

References Cited by the Examiner
UNITED STATES PATENTS
3,013,020  12/61  Fancher _____ 260—570.5 X CHARLES B. PARKER, *Primary Examiner.*
IRVING MARCUS, *Examiner.*